United States Patent
Zhang et al.

(10) Patent No.: US 10,285,201 B2
(45) Date of Patent: May 7, 2019

(54) TRANSMITTING AND RECEIVING WIRELESS DEVICES AND RESPECTIVE METHODS PERFORMED THEREBY FOR TRANSMISSION OF DATA IN A CONTENTION BASED WIRELESS NETWORK

(71) Applicant: Telefonaktiebolaget LM Ericsson (publ), Stockholm (SE)

(72) Inventors: Zhan Zhang, Beijing (CN); Robert Baldemair, Solna (SE); Jonas Kronander, Knivsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 312 days.

(21) Appl. No.: 15/101,634

(22) PCT Filed: Dec. 18, 2013

(86) PCT No.: PCT/SE2013/051562
§ 371 (c)(1),
(2) Date: Jun. 3, 2016

(87) PCT Pub. No.: WO2015/094046
PCT Pub. Date: Jun. 25, 2015

(65) Prior Publication Data
US 2017/0006633 A1 Jan. 5, 2017

(51) Int. Cl.
*H04W 72/04* (2009.01)
*H04W 74/08* (2009.01)

(52) U.S. Cl.
CPC ....... *H04W 74/08* (2013.01); *H04W 72/0406* (2013.01); *H04W 72/0453* (2013.01)

(58) Field of Classification Search
CPC combination set(s) only.
See application file for complete search history.

(56) References Cited

U.S. PATENT DOCUMENTS 4,907,224 A * 3/1990 Scoles ................ H04W 28/26
370/443
5,644,576 A * 7/1997 Bauchot ............... H04W 74/02
370/337

(Continued)

FOREIGN PATENT DOCUMENTS

EP 0920226 A2 6/1999
EP 2528402 A1 11/2012

(Continued)

OTHER PUBLICATIONS

International Search Report and Written Opinion for International Patent Application No. PCT/SE2013/051562, dated Sep. 4, 2014, 9 pages.

(Continued)

*Primary Examiner* — Edan Orgad
*Assistant Examiner* — Emmanuel K Maglo
(74) *Attorney, Agent, or Firm* — Patent Portfolio Builders, PLLC

(57) ABSTRACT

A transmitting wireless device and a method for performing a transmission to a receiving wireless device as well as a receiving wireless device and a method for receiving a transmission from the transmitting device are provided. Both wireless devices operate in a wireless network applying a contention-based medium access control protocol. The wireless network operates on a frequency resource. The method for performing a transmission to the receiving wireless comprises identifying a control channel of the frequency resource; and contending, at the control channel, for resources on a data channel of the frequency resource. When the contention for resources is successful, the method further comprises transmitting data to the receiving wireless device on the data channel of the frequency resource, (Continued)

wherein the control channel and data channel operate on separate frequencies of the frequency resource.

22 Claims, 8 Drawing Sheets

(56) References Cited

U.S. PATENT DOCUMENTS

| | | | | |
|---|---|---|---|---|
| 8,259,647 | B2* | 9/2012 | Shao | H04N 21/43637 370/328 |
| 2007/0002887 | A1* | 1/2007 | Benveniste | H04W 74/00 370/437 |
| 2007/0070922 | A1* | 3/2007 | Benveniste | H04L 1/1621 370/254 |
| 2008/0165709 | A1* | 7/2008 | Soliman | H04W 88/06 370/280 |
| 2008/0225790 | A1* | 9/2008 | Kupershmidt | H04W 16/14 370/330 |
| 2009/0168744 | A1* | 7/2009 | Park | H04W 74/006 370/349 |
| 2011/0292895 | A1* | 12/2011 | Wager | H04L 5/0007 370/329 |
| 2012/0207036 | A1* | 8/2012 | Ong | H04W 74/0816 370/252 |
| 2014/0146857 | A1* | 5/2014 | Guichard | H04B 1/7143 375/134 |
| 2015/0312905 | A1* | 10/2015 | Seo | H04B 7/2656 370/280 |
| 2016/0135016 | A1* | 5/2016 | Zou | H04W 4/06 370/312 |

FOREIGN PATENT DOCUMENTS

| | | |
|---|---|---|
| EP | 2536235 A1 | 12/2012 |
| WO | 2013142040 A1 | 9/2013 |

OTHER PUBLICATIONS

Office action in application No. 13824680.6 dated Dec. 1, 2017.

* cited by examiner

TRANSMITTING AND RECEIVING WIRELESS DEVICES AND RESPECTIVE METHODS PERFORMED THEREBY FOR TRANSMISSION OF DATA IN A CONTENTION BASED WIRELESS NETWORK

This application is a 35 U.S.C. § 371 national phase filing of International Application No. PCT/SE2013/051562, filed Dec. 18, 2013, the disclosure of which is incorporated herein by reference in its entirety.

TECHNICAL FIELD

The present disclosure relates to data transmission in a wireless network and in particular to data transmission in a wireless network applying a contention-based medium access control protocol.

BACKGROUND

Currently, data traffic are boosting rapidly while there exist clear bandwidth limitations in low frequency bands. The wireless industry is seeking to use higher frequency bandwidth in order to reach even higher data rates.

Some foreseen future use cases require data rates in the order of 10 Gbps. Providing such large data rates in an energy-efficient manner requires bandwidth in the order of many 100 MHz or even a few GHz, preferably contiguous bandwidth to ease implementation. Such large spectrum holdings are realistically only available in the millimeter-wave bands. Densification together with operation at very wide bandwidths in the millimeter-wave bands constitutes the concept Ultra-Dense Networks, UDN. In addition, a UDN should provide

- As much capacity abundance in wireless networks as is available on fibre access;
- Operator managed[1] network access of areas not adequately served by cellular, such as densely populated public spaces, enterprises and indoor spaces;

[1] In this context an operator can be a traditional operator but also a non-traditional one, e.g. a building owner which operates a UDN.

- Enhanced network energy efficiency in order to retain a low energy footprint also in the future despite the expected massive traffic increase;
- Coordination within and with overlaid networks (if present) for ease of access, energy efficiency, and mobility.

The main motivation for UDN is energy efficient provision of substantially increased data rates and capacity compared to today's mobile broadband networks. UDN deployment therefore mostly makes sense in areas with high demands on data rate and/or capacity.

Examples of such areas are private property or semipublic spaces such as corporate buildings, campus, hotels, libraries, public buildings like arenas, shops, airports, train stations, train cars, outdoor environments, e.g. parks and city centres; as well as home and small offices.

Given the dense deployment and large number of UDN access nodes, simple and unplanned network deployment is very important. Even integration of user-deployed UDN access nodes should be supported. One interesting aspect of UDN deployment could be backhaul provision to a variety of access technologies, including UDN, LTE, Wi-Fi, Machine-Type Communications, MTC, standards, etc.

A typical deployment for Ultra Dense Networks, UDNs, is highly populated areas. Example deployments are hot spots, office building, or downtown areas in cities, where demands for high data rate service are present. Hence, it is necessary for UDN to utilise a higher carrier frequency and a wider bandwidth in order to reach a high data rate.

Due to unpredictable placement, antenna tilting angles, and adaptive beam-forming of each access point, AP, nodes, flash-light like interference could be a top reason to prevent a stable and high performance of UDN unless media access control, MAC, provides a flexible and effective mechanism.

It is expected that radio channel of UDN usually has a large bandwidth, e.g., varying for several tens, hundreds of MHz to larger than multiple GHz. The interference management across a vast bandwidth, either in continuous or disjoint bands, could be potentially complicated if Medium Access Control, MAC, does not provide a simple but effective solution.

The market trend and features of UDN differ from those of conventional system in that the owner of UDN might not be an operator company with a great expertise in cell planning and dominates the radio service in an area. The owners of UDN could be of distinct businesses, for instance, a real estate owner might own a UDN network, and install or improve or expand the UDN in their premises. Though they might get consulting from radio industry, however, a large portion of activities and decisions on maintenance and installation could be at their discretion.

Then, their UDNs' coverage could be partially or totally overlapping with each other. This put UDNs into a radio environment of full of possibility of interferences. As the involving node number is large, the interference manage method of MAC at UDN has to be simple and efficient.

Currently, Institute of Electrical and Electronics Engineers, IEEE, specification IEEE-802.11 system mainly runs in the unlicensed frequency band. In recent standard of IEEE 802.11, nodes, either terminals or APs, are competing resource via a mechanism of "listen before talk". That is, a node can transmit signal only when the detected transmission, TX, is lower than a certain predefined threshold in order to avoid colliding of signals.

This is implemented using the so called Distributed Coordination Function, DCF, wherein each node waits a random back-off before accessing the channel, allowing other nodes to get an on the long term fair chance to access the channel. If another second node has a back-off time that becomes zero before the first node, the first node notices that the second node has started transmitting, by sensing the channel, e.g. listening to the channel, it postpones its transmission. At the next transmission possibility the node continues to count down the back-off time until it is zero. When the back-off time timer expires, i.e. the back-off timer becomes zero, the node performs its transmission.

Upon a collision, the nodes increase, up to a certain limit, their sensing, i.e. back-off, time in order to avoid further colliding to a large extent. In addition, each transmission contains a time indication Network Allocation Vector, NAV, which indicates the channel occupation of the transaction. This mechanism is also referred to as virtual carrier sense. A neighbouring node which detects transmissions and decodes the NAV should start a timer with the period indicated by NAV and wait until the timer expires. When the timer expires, the node starts another sensing on the availability of channel.

Both these mechanisms can be complemented by Request To Send and Clear To Send signalling to further reduce the possibility of a hidden node where the transmitter and this node could not sense the activity of each other but this node interferes with the receiver. Also Request to Send and Clear to Send signalling include NAV. A node that intents to transmit data sends out an Request to Send and only if it also receives a Clear to Send, it will start with the actual data transmission. Due to the NAV included in Request to Send and Clear to Send, neighbouring nodes overhearing Request to Send and/or Clear to Send know that a transmission will start and defer their own channel access by the time indicated by NAV.

By such a method, each node has a chance to get the radio resource. Such a scheme works well when the traffic is rather low. In case of high traffic load, resource efficiency becomes rather low due to an increased number of collisions, due to an increased probability of collisions. In brief the 802.11 DCF does not scale too well with increasing number of contending nodes and offered traffic.

SUMMARY

The object is to obviate at least some of the problems outlined above. In particular, it is an object to provide a transmitting wireless device and a method performed thereby for performing a transmission to a receiving wireless device, wherein both wireless devices operating in a wireless network applying a contention-based medium access control protocol. It is further an object to provide a receiving wireless device and a method performed thereby for receiving a transmission from a transmitting device, wherein both wireless devices operating in a wireless network applying a contention-based medium access control protocol. The wireless network operates on a frequency resource. These objects and others may be obtained by providing a transmitting wireless device and a receiving wireless device respectively and a respective method performed by the transmitting wireless device and the receiving wireless device according to the independent claims attached below.

According to an aspect a method performed by a transmitting wireless device for performing a transmission to a receiving wireless device, wherein both wireless devices operate in a wireless network applying a contention-based medium access control protocol and the wireless network operates on a frequency resource is provided. The method comprises identifying a control channel of the frequency resource; and contending, at the control channel, for resources on a data channel of the frequency resource. When the contention for resources is successful, the method further comprises transmitting data to the receiving wireless device on the data channel of the frequency resource, wherein the control channel and data channel operate on separate frequencies of the frequency resource.

According to yet an aspect, a method performed by a receiving wireless device for receiving a transmission from a transmitting wireless device, wherein both wireless devices operate in a wireless network applying a contention-based medium access control protocol and the wireless network operates on a frequency resource is provided. The method comprises identifying a control channel of the frequency resource; and receiving, from the transmitting wireless device, on the identified control channel, a request for performing a transmission to the receiving wireless device on a data channel of the frequency resource. The method further comprises determining that no other conflicting reservation of the data channel of the frequency resource has been performed; and transmitting a reservation confirmation to at least the transmitting wireless device.

According to still an aspect, a transmitting wireless device adapted for performing a transmission to a receiving wireless device, wherein both wireless devices operate in a wireless network applying a contention-based medium access control protocol and the wireless network operates on a frequency resource is provided. The transmitting wireless device comprises a processor and memory. The memory comprises instructions which when executed by the processor causes the transmitting wireless device to identify a control channel of the frequency resource; and to contend, at the control channel, for resources on a data channel of the frequency resource. The memory further comprises instructions which when executed by the processor causes the transmitting wireless device to, when the contention for resources is successful, transmit data to the receiving wireless device on the data channel of the frequency resource, wherein the control channel and data channel operate on separate frequencies of the frequency resource.

According to another aspect, a receiving wireless device adapted for receiving a transmission from a transmitting wireless device, wherein both wireless devices operate in a wireless network applying a contention-based medium access control protocol and the wireless network operates on a frequency resource is provided. The receiving wireless device comprises a processor and memory. The memory comprises instructions which when executed by the processor causes the receiving wireless device to identify a control channel of the frequency resource; and to receive, from the transmitting wireless device, on the identified control channel, a request for performing a transmission to the receiving wireless device on a data channel of the frequency resource. The memory further comprises instructions which when executed by the processor causes the receiving wireless device to determine that no other conflicting reservation of the data channel of the frequency resource has been performed, and to transmit a reservation confirmation to at least the transmitting wireless device.

According to yet an aspect, a transmitting wireless device for performing a transmission to a receiving wireless device, wherein both wireless devices operate in a wireless network applying a contention-based medium access control protocol and the wireless network operates on a frequency resource is provided. The transmitting wireless device comprises an identifying unit for identifying a control channel of the frequency resource; and a contending unit for contending, at the control channel, for resources on a data channel of the frequency resource. The transmitting wireless device further comprises a transmitting unit for, when the contention for resources is successful, transmitting data to the receiving wireless device on the data channel of the frequency resource, wherein the control channel and data channel operate on separate frequencies of the frequency resource.

According to still an aspect, a receiving wireless device for receiving a transmission from a transmitting wireless device, wherein both wireless devices operate in a wireless network applying a contention-based medium access control protocol and the wireless network operates on a frequency resource is provided. The receiving wireless device comprises an identifying unit for identifying a control channel of the frequency resource, and a receiving unit for receiving, from the transmitting wireless device, on the identified control channel, a request for performing a transmission to the receiving wireless device on a data channel of the frequency resource. The receiving wireless device further comprises a determining unit for determining that no other conflicting reservation of the data channel of the frequency resource has been performed; and a transmitting unit for transmitting a reservation confirmation to at least the transmitting wireless device.

The method performed by a transmitting wireless device for performing a transmission to a receiving wireless device and the method performed by a receiving wireless device for receiving a transmission from a transmitting wireless device as well as the transmitting wireless device and receiving wireless device may have several advantages. In wireless networks where there is a plurality of users and/or the users generate a lot of traffic, the data channel or data channels may be kept free from interference, or the interference on the data channel may be reduced. Thus the interference handling may be efficient and reduced only to the control channel. Link adaptation may be facilitated. The respective method and wireless device may facilitate inter-network adaptation by reducing the inter-network interference, e.g. in case of multiple co-channels wireless networks with complete or partial coverage overlap, wherein the individual wireless networks are deployed by different owners or operations. The respective method and wireless device may further facilitate intra-network adaptation by reducing the inter-network interference, e.g. in case of one wireless device transmits in uplink at the same time-frequency resource blocks while another wireless device receives in downlink. Still a possible advantage is that the respective method and wireless device may be able to endure synchronisation errors due to relaxed synchronisation constraints over a large and ever-increasing number of nodes and/or devices.

BRIEF DESCRIPTION OF DRAWINGS

Embodiments will now be described in more detail in relation to the accompanying drawings, in which.

DETAILED DESCRIPTION

Briefly described, a transmitting wireless device and a method performed by the transmitting wireless device for performing a transmission to a receiving wireless device are provided. Both wireless devices operate in a wireless network applying a contention-based medium access control protocol and the wireless network operates on a frequency resource. Also a receiving wireless device and a method performed by the receiving wireless device for receiving a transmission from a transmitting wireless device are provided. Both wireless devices operate in a wireless network applying a contention-based medium access control protocol and the wireless network operates on a frequency resource. The frequency resource is split or divided into at least two portions, a portion being intended for control, hereinafter referred to as a control channel, and a data portion. The data portion of the frequency resource is hereinafter referred to as a data channel. It shall be pointed out that the data portion could comprise a plurality of data channels and/or a data channel may in turn be divided into several portions.

Embodiments of a method performed by a transmitting wireless device for performing a transmission to a receiving wireless device, wherein both wireless devices operate in a wireless network applying a contention-based medium access control protocol and the wireless network operates on a frequency resource will now be described with reference to FIGS. 1a and 1b.

Figure 1A:
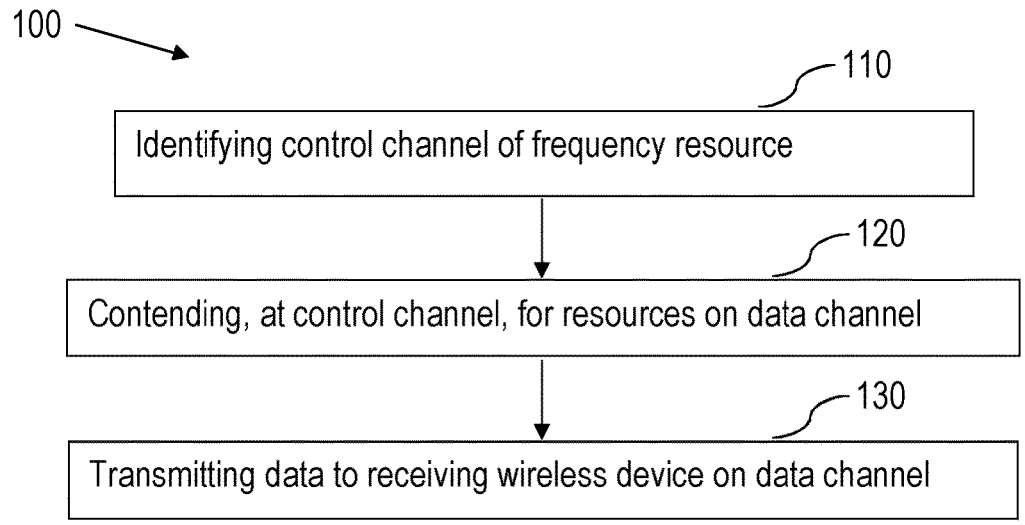
FIG. 1a is a flowchart of a method performed by a transmitting wireless device according to an exemplifying embodiment.
Figure 1B:
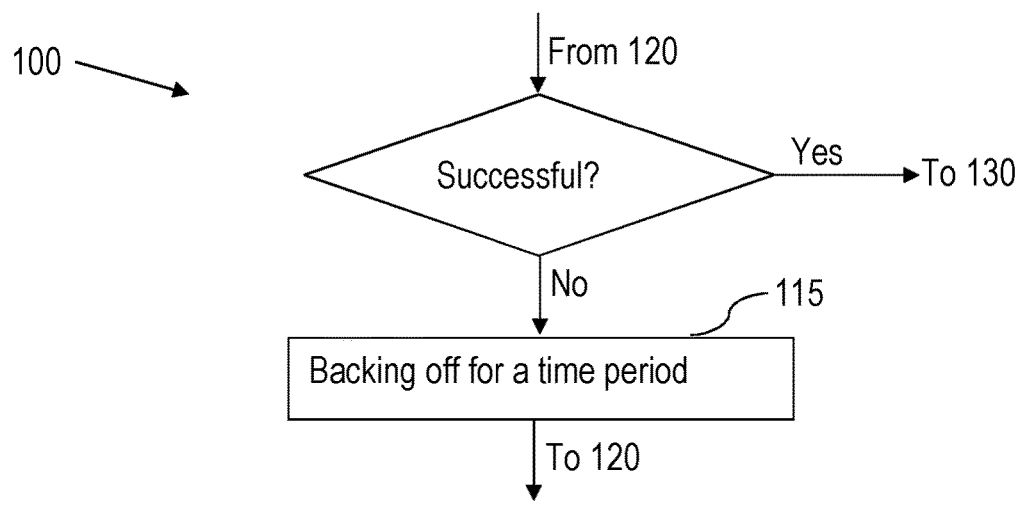
FIG. 1b is a flowchart of a method performed by a transmitting wireless device according to still an exemplifying embodiment.

FIG. 1a illustrates the method comprising identifying 110 a control channel of the frequency resource; and contending 120, at the control channel, for resources on a data channel of the frequency resource. When the contention for resources is successful, the method further comprises transmitting 130 data to the receiving wireless device on the data channel of the frequency resource, wherein the control channel and data channel operate on separate frequencies of the frequency resource.

When a wireless device e.g. is set up, power on or becomes connected to an access node or access point, the wireless device may receive signalling from the wireless network, e.g. via a network access node or access point, which signalling identifies different channels, e.g. the control channel and the data channel of the frequency resource of the wireless network. Alternatively, the wireless device may be pre-programmed with information pertaining to the different channels, e.g. the control channel and the data channel of the frequency resource of the wireless network. Thus, identifying 110 the control channel of the frequency resource may be done, by accessing a memory of the wireless device comprising the information or by receiving signalling from the wireless network, the signalling comprising information pertaining to the different channels, e.g. the control channel and the data channel of the frequency resource of the wireless network.

Once the transmitting wireless device has identified the control channel, the transmitting wireless device is enabled to contend 120, at the control channel, for at least one resource on a data channel of the frequency resource. It shall be pointed out that there may be more than one data channel and a data channel may further be divided or partitioned into a plurality of portions. Contending for resources on a data channel of the frequency resource may comprise, possibly repeatedly at various time instances, sending a Request To Send message or sending a Transmission Reservation Request, TxRR, message to the receiving wireless device until a Clear To Send message or a Reservation Confirmation, RC, message is received from the receiving wireless device. It shall be pointed out that the contention for resources on a data channel may comprise contending for resources on one or more data channels or comprise contending for one or more partitions of one or more data channels.

If a Clear to Send, a RC or any other message or information is received indicating that the contention for resources was successful, then the transmitting wireless device transmits 130 data to the receiving wireless device on the data channel of the frequency resource.

Since the frequency resource upon which the wireless network operates is divided or partitioned into the control channel and the at least one data channel, the control channel and the at least one data channel operate on separate frequencies.

The method performed by the transmitting wireless device may have several advantages. In wireless networks where there is a plurality of users and/or the users generate a lot of traffic, the data channel or data channels may be kept free from interference, or the interference on the data channel may be reduced. Thus the interference handling may be efficient and reduced only to the control channel. Link adaptation may be facilitated. The solution may facilitate inter-network adaptation by reducing the inter-network interference, e.g. in case of multiple co-channels wireless networks with complete or partial coverage overlap, wherein the individual wireless networks are deployed by different owners or operations. The solution may further facilitate intra-network adaptation by reducing the intra-network interference, e.g. in case of one wireless device transmits in uplink at the same time-frequency resource blocks while another wireless device receives in downlink. Still a possible advantage is that the solution may be able to endure synchronisation errors due to relaxed synchronisation constraints over a large and ever-increasing number of nodes and/or devices.

As explained above, identifying 110 the control channel may comprise receiving signalling, from the wireless network, indicating which frequency or frequencies the control channel operates on.

Merely as an example, the wireless network may comprise a plurality of access points or access nodes by means of which wireless devices may be connected to the wireless network. Then the wireless network may signal, to the wireless device by means of the access points or access nodes.

When the contention is unsuccessful, the method may further comprise the transmitting wireless device backing-off 115 from contending for resources on the data channel for a period of time until anew contending 120 for resources on a data channel is performed on the control channel. This is also illustrated in FIG. 1b.

The contention for resources on the data channel may be successful or unsuccessful. When the contention is successful, the transmitting wireless device may receive some form of confirmation from the data receiving device that the contention was successful and optionally also an indication of when in time and for how long the wireless device may transmit. When the contention fails, i.e. unsuccessful, the transmitting wireless device may e.g. receive information from the data receiving device indicating that the contention failed, or the transmitting wireless device may simply not receive any information at all, that is no confirmation or acknowledgement and no negative confirmation or negative acknowledgement. It may be that the contention failed due to e.g. the transmission resource request, TxRR, being lost due to interference on the control channel. Thus, the transmitting wireless device may start a timer each time that the transmitting wireless device sends a TxRR and if the timer expires before any confirmation or negative confirmation is received, the transmitting wireless device deduces that the contention failed, i.e. the contention was un-successful.

Once the transmitting wireless device deduces that the contention was unsuccessful, either by receiving information or by the lack of receiving a confirmation, the transmitting wireless device may back off 115 from contending for resources on the data channel for a period of time. For example, once the transmitting wireless device deduces that the contention was unsuccessful, the transmitting wireless device starts a timer and when the timer expires, the transmitting wireless device may anew contend 120 for resources on the data channel, wherein the contention is performed on the control channel.

The period of time for when the transmitting wireless device backs off 115 from contending for resources may depend on a priority of the transmitting wireless device.

Different wireless devices may have different priorities when contending 120 for resources on the data channel. The different priorities may depend on e.g. a subscription associated with the wireless device, capabilities of the wireless device, traffic class associated with the wireless device and/or the type of data that the wireless device wishes to send. It shall be pointed out that the examples above are merely non-limiting examples. Generally, a transmitting wireless device being associated with a relatively low priority may back off for a longer period of time as a transmitting wireless device being associated with a relatively high priority may back off for a longer period of time. In this manner, a transmitting wireless device may be more likely to succeed in the contention for resources on the data channel, the contention being performed on the control channel.

According to an embodiment, contending 120 for resources may comprises transmitting a data-transmission request to the receiving wireless device, the request comprising at least one of the identity of the transmitting wireless device, identity of the receiving wireless device, transmission start time of the data transmission, and duration in time of the data transmission.

The data-transmission request is transmitted from the transmitting wireless device to the receiving wireless device. By the data-transmission request, the transmitting wireless device informs the receiving wireless device that the transmitting wireless device has data to send to the receiving wireless device.

Since the data-transmission request may be received by a plurality of wireless devices, the data-transmission request may comprise the identity of the receiving wireless device. Thus all wireless devices are informed that the transmitting wireless device intends, or wants, to transmit data to the receiving wireless device having the identity comprised in the data-transmission request. The receiving wireless device having the identity comprised in the data-transmission request may then react to the data-transmission request, e.g. by granting the request by means of sending a reservation confirmation, RC, message to the transmitting wireless device, as will be explained below.

The data-transmission request may further comprise the identity of the transmitting wireless device. Thus, when the receiving wireless device having the identity comprised in the data-transmission request e.g. sends the RC message to the transmitting wireless device, the receiving wireless device may incorporate the identity of the transmitting wireless device into the RC message. The RC message may, as the data-transmission request, be received by a plurality of wireless devices. The RC message may in this manner inform a plurality of wireless devices of a possible data transmission on the data channel, or at least a portion thereof, that will take place in the near future.

Still further, the data-transmission request may comprise the start time of the data transmission. Since the data-transmission request may be received by a plurality of wireless devices, all wireless device including the receiving wireless device are informed that a possible data transmission may take place at the point in time indicated in the data-transmission request. Since a plurality of wireless devices may receive the different messages being sent between the transmitting and the receiving wireless device, the plurality of wireless devices are enabled of keeping track of different activities on the data channel. The receiving wireless device receives the data-transmission request and is informed that the transmitting wireless device wishes to send data to the receiving wireless device. The transmitting wireless device further wishes to start transmitting the data at the point in time indicated in the data-transmission request. The receiving wireless device may base a decision to grant the request, to reject the request or grant the request with modifications based on information obtained by previously received messages, or signals, between the plurality of wireless devices. Thus the receiving device may e.g. determine that the transmitting wireless device may transmit the data at the time indicated in the data-transmission request. Alternatively, the receiving device may determine that the transmitting wireless device may transmit the data at e.g. 0.5 or 1.5 seconds after the time indicated in the data-transmission request.

The data-transmission request may further comprise the duration in time of the data transmission. Similarly to the data-transmission request comprising the start time of the data transmission, the receiving wireless device may determine, based on previous received messages, or signals, sent between individual wireless devices of the plurality of wireless device, that the requested data transmission does or does not conflict with any previous reservations of resources of the data channel. When any wireless device sends e.g. an RC to another wireless device, the RC may be received by a plurality of wireless device. The RC may indicate e.g. the start time and duration of a data transmission and may thus be seen as a reservation of resources of the data channel. Consequently, based on previously received RCs sent between individual wireless devices, the receiving wireless device is enabled to determine when a possibly conflicting data transmission may start and the duration of the possibly conflicting data transmission.

The request may further comprise an indication of a portion of the data channel.

As described above, there may be more than one data channel and the data channel, or channels, may be divided into individual portions. Thus the data-transmission request may indicate one or more portions of one or more data channel that the transmitting wireless device wishes to reserve for transmission of data to the receiving wireless device.

Embodiments herein also relate to a method performed by a receiving wireless device for receiving a transmission from a transmitting wireless device both wireless devices operating in a wireless network applying a contention-based medium access control protocol, the wireless network operating on a frequency resource. Such a method will now be described with reference to FIG. 2.

Figure 2:
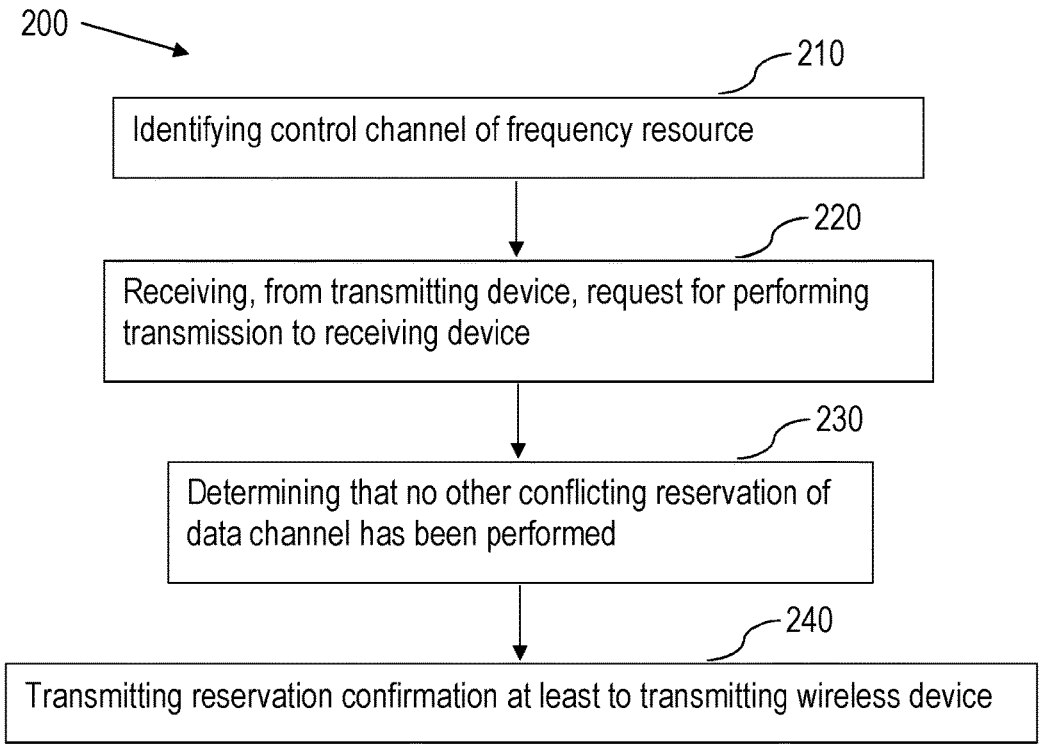
FIG. 2 is a flowchart of a method performed by a receiving wireless device for receiving a transmission from a transmitting wireless device according to an exemplifying embodiment.

FIG. 2 is a flowchart of a method performed by the receiving wireless device for receiving a transmission from a transmitting wireless device according to an exemplifying embodiment. FIG. 2 illustrates the method comprising identifying 210 a control channel of the frequency resource; and receiving 220, from the transmitting wireless device, on the identified control channel, a request for performing a transmission to the receiving wireless device on a data channel of the frequency resource. The method further comprises determining 230 that no other conflicting reservation of the data channel of the frequency resource has been performed; and transmitting 240 a reservation confirmation to at least the transmitting wireless device.

Just as for the transmitting wireless device, when the receiving wireless device e.g. is set up, powered on or becomes connected to an access node or access point, the receiving wireless device may receive signalling from the wireless network, e.g. via a network access node or access point, which signalling identifies different channels, e.g. the control channel and the data channel of the frequency resource of the wireless network. Alternatively, the receiving wireless device may be pre-programmed with information pertaining to the different channels, e.g. the control channel and the data channel of the frequency resource of the wireless network. Thus, identifying 210 the control channel of the frequency resource may be done, by accessing a memory of the wireless device comprising the information or by receiving signalling from the wireless network, the signalling comprising information pertaining to the different channels, e.g. the control channel and the data channel of the frequency resource of the wireless network.

At a point in time, a transmitting wireless device wishes to send data to the receiving wireless device and transmits a request for performing a transmission to the receiving wireless device. This request is sent on the control channel as described above. The request for performing a transmission to the receiving wireless device is the same as the above described request for resources on the data channel. This request for performing a transmission to the receiving wireless device on a data channel of the frequency resource is received 220 by the receiving wireless device on the identified control channel.

As described above, there may by a vast plurality of wireless devices sending requests for resources, i.e. requests for performing transmissions to the other wireless devices. Likewise, the vast plurality of wireless devices may generate and send RCs which may be received by the receiving wireless device. Thus the receiving wireless device may receive a plurality of different such requests and RCs, and is in this manner informed of activities, e.g. reservations of resources, on the data channel.

The receiving wireless device may thus determine 230 that no other conflicting reservation of the data channel of the frequency resource has been performed based on all the previously received requests and may then transmit 240 a reservation confirmation to at least the transmitting wireless device.

In case the data channel is partitioned, or divided, into individual resources or partitions, a conflicting reservation of the data channel is a reservation for the same resource(s) or partition(s) for the same time period as the transmitting wireless device wishes to use for sending data to the receiving wireless device. In case the data channel is not partitioned or divided, then a conflicting reservation of the data channel is a reservation that overlaps the same time period as the transmitting wireless device wishes to use for sending data to the receiving wireless device.

As the reservation confirmation, RC, is transmitted to at least the transmitting wireless device, the RC may be received by the plurality of individual wireless devices and they are in this manner informed about an upcoming transmission of data on the data channel as indicated in the RC.

The method performed by the receiving wireless device may have the same possible advantages as the method performed by the transmitting wireless device. In wireless networks where there is a plurality of users and/or the users generate a lot of traffic, the data channel or data channels may be kept free from interference, or the interference on the data channel may be reduced. Thus the interference handling may be efficient and reduced only to the control channel. Link adaptation may be facilitated. The solution may facilitate inter-network adaptation by reducing the inter-network interference, e.g. in case of multiple co-channels wireless networks with complete or partial coverage overlap, wherein the individual wireless networks are deployed by different owners or operations. The solution may further facilitate intra-network adaptation by reducing the inter-network interference, e.g. in case of one wireless device transmits in uplink at the same time-frequency resource blocks while another wireless device receives in downlink. Still a possible advantage is that the solution may be able to endure synchronisation errors due to relaxed synchronisation constraints over a large and ever-increasing number of nodes and/or devices.

Identifying 210 the control channel may comprise receiving signalling, from the wireless network, indicating which frequency or frequencies the control channel operates on.

Merely as an example, the wireless network may comprise a plurality of access points or access nodes by means of which wireless devices may be connected to the wireless network. Then the wireless network may signal, to the wireless device by means of the access points or access nodes.

Also as explained above, the received request may comprises at least one of the identity of the transmitting wireless device, identity of the receiving wireless device, transmission start time of the data transmission, and duration in time of the data transmission.

The request for performing a transmission to the receiving wireless device on a data channel of the frequency resource corresponds to the data-transmission request described above in conjunction with the method performed by the transmitting wireless device.

The request is transmitted from the transmitting wireless device to the receiving wireless device. By the request, the transmitting wireless device informs the receiving wireless device that the transmitting wireless device has data to send to the receiving wireless device. In this manner, the receiving wireless device may be informed of which wireless device, i.e. the transmitting wireless device, what to transmit on the data channel, or a resource thereof. The receiving wireless device may be informed of when in time the transmitting wireless device wants to start transmitting and for how long the transmission will go on in time.

The receiving wireless device may thus use this information together with information obtained from previously received RCs from other wireless devices when determining 230 that no other conflicting reservation of the data channel of the frequency resource has been performed.

The received request may comprise an indication of a portion of the data channel.

As explained above, there may be one or more data channels and a data channel may in turn be divided into several portions. Thus the received request may comprise the indication of one or more portions of one or more data channels that the transmitting wireless device wishes to use for transmitting the data to the receiving wireless device. Further, a portion of a data channel may be a portion in time and/or frequency.

The method may further comprise receiving a reservation confirmation from a third wireless device, the received reservation confirmation comprising information pertaining to a reservation of at least a portion of the data channel for a period of time, wherein determining 230 that no other reservation of a data channel of the frequency resource has been performed is based at least partly on the received reservation confirmation from the third wireless device.

The different wireless devices may receive requests for resources and/or reservation confirmations intended for other wireless devices. In this manner, the individual wireless devices may keep track of activities, e.g. reservations and transmissions, on the data channel or portions thereof. Thus the receiving wireless device may have information of ongoing and possibly imminent data transmissions on the data channel, or on different portions thereof. This enables the receiving wireless device to check any indicated start time, duration, and frequency resource in a received request against the information previously received.

Figure 3A:
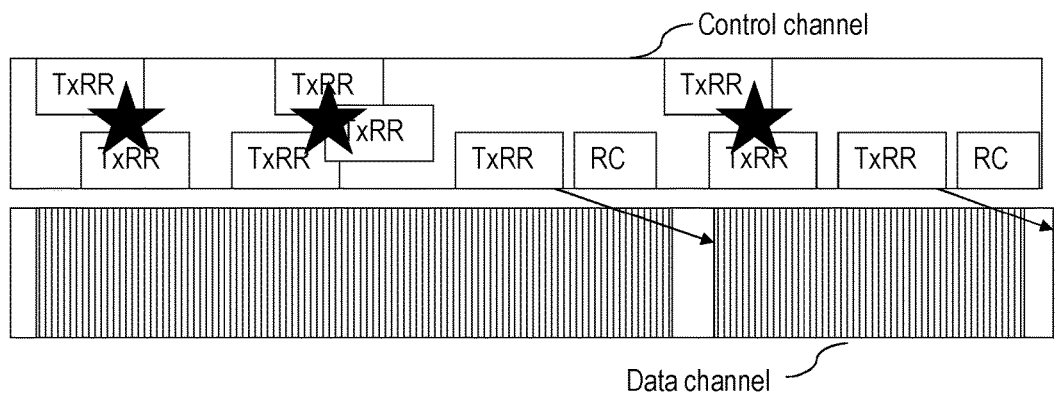
FIG. 3a illustrates a snapshot of events taking place on a control channel and a data channel during a period of time.

FIG. 3a illustrates a snapshot of events taking place on a control channel and a data channel during a period of time. On the control channel, two data-transmission requests, TxRRs, are transmitted almost simultaneously by two individual wireless devices. The two TxRRs collide or overlap, and are thus lost due to interference. This is illustrated by a black star. A little bit after that in time, three TxRRs are transmitted almost simultaneously by three individual wireless devices. Also these three TxRRs are lost due to interference, also illustrated by a black star. During this contention on the control channel, data is transmitted on the data channel.

Then a TxRR is transmitted from a transmitting wireless device and since it is not lost due to interference, the TxRR is successfully received by the intended receiving wireless device, and possibly a plurality of other wireless devices. The successfully received TxRR comprises in this example a transmission start time and duration in time. The transmission start time and duration in time do not overlap with any other reservation and thus the receiving wireless device may send an RC to the transmitting wireless device, which in turn may start transmitting data at the desired transmission start time.

FIG. 3a also illustrates that after the successfully received TxRR, two other TxRRs overlap or collide on the control channel before another TxRR is successfully received by the same or a second receiving wireless device.

It shall be pointed out that the example illustrated in FIG. 3a is very simplified. Generally, there may be a plurality of TxRRs transmitted more or less simultaneously without causing so much interference as to lose the TxRRs i.e. receivers could not successful detect and decode the TxRRs.

The above described methods may be especially useful and advantageous in situations of a vast number of concurrent users, e.g. in so called Ultra Dense Networks, UDN.

A UDN comprises a large number of super densely deployed nodes. Hence, UDN nodes have to possess a strong capability to handle the interference. Interference avoidance, intra-UDN or inter-UDN, at a Media Access Control, MAC, is a leverage to simplify the design of network and device. The densely deployed UDN nodes should be capable to cooperate on the interference avoidance without inducing substantial complexity increase and spectrum efficiency degradation.

By splitting resource for control channel where wireless devices contend to reserve resource blocks for data transmissions, while data-transmission is done at a separate resource portion other than those of control channel, the resources, or resource blocks, for data-transmission may be used more efficiently. The data channel transmission and corresponding receptions follow the contention results of control signalling. Contention mainly happens in dedicated control sub-bands. Collisions of data transmission are substantially minimised compared to that of convention Carrier Sense Multiple Access with Collision Avoidance, CSMA/CA, methods.

Both data channel and control channel may use a dynamic frame length or structure. The transmission length at control channel depends on the signalling formats and at data channel depends on the claimed radio resource by the wireless devices.

Radio resource control for wireless backhaul is also carried out through above-mentioned separate control channel. Wireless device may have a wireless backhaul, such a wireless device has an additional role other than that of a standard wireless device. In other words, any wireless backhaul based wireless device essentially has both access point function serving its associated wireless devices and a "backhaul-wireless device" function serving communication with Aggregate-Access Point, AGP, for a backhaul.

Generally, the control channel occupies a rather small portion of the total radio resources to limit the overhead cost. By splitting or dividing the frequency resource of the wireless network into sub-bands, i.e. a control channel and at least one data channel, collisions on the data channel may be reduced or even possibly eliminated, since contention for resources will take place on the control channel.

However, collisions may occur on the control channel. Collisions in control channel is not a severe problem as the control signalling is usually short and of a low payload. Medium Access Control, MAC design, described in this document exploits data volume being much larger than contention signalling. If load in control channel becomes too high and collision rate becomes unacceptable the resources set aside for contention based control signalling may be increased. Given the small amount of control resources (in absolute terms, compared to data resources) the control overhead is still small. Hence, the aforementioned embodiments described herein help in minimising wasting data transmission opportunities as long as at least one TxRR-RC are being successfully exchanged during the on-going data transmissions, TxRR—transmission resource request is the request for communication resources sent by an initiator, transmitting wireless device, the reply RC is receiver's, receiving wireless device's, confirmation on transmission resource reservation sent by the initiator, i.e. similar to the Request to Send-Clear to Send message exchange but in the separate control channel. Wasting data transmission opportunities of a wide bandwidth usually happens in conventional contention based systems. The methods described above may help to minimise this phenomenon.

Both data channel and control channel transmission/reception may use a dynamic frame length or structure. The transmission length at control channel depends on the signalling formats and at data channel depends on acclaimed radio resource by nodes or wireless devices.

The data lengths may be determined by results of control channel contention or negotiations among wireless devices or Access Point, AP, nodes according to priorities and traffic types and fairness metrics.

Regarding the contention at control channel for reserving resource at data channel, e.g. as in FIG. 3a, transmission initiating nodes, e.g. the transmitting wireless device, or scheduling initiating nodes, APs, may send signalling similar to transmission and/or reception, at which information could include the transmitter and receiver MAC id, transmission timing & durations, etc. The wireless devices and APs may monitor the control channel and perceive the current reservation and possible collisions, and may store the contention results in a local database for decision reference for their future reservation process. The reception nodes are supposed to respond by Clear to Send-like signalling, at which information could include the transmitter and receiver MAC id, transmission/reception timing & durations, recommendation on suitable modulation and coding scheme, measurements on interference, etc. By Clear To Send-like signalling is intended e.g. signalling informing a transmitting receiver that it is ok to start transmitting. Whenever Transmission Resource Request, TxRR, and reservation confirmation, RC, signalling are successfully received without collision, the specified transmission operation is carried out at data channel. ACK/NACK signalling is also supposed to be transmitted at control channel, either in piggyback fashion or in other ways. Transmission resource request messages are sent to book, or reserve, resources for data transmission.

Non-limiting examples of devices and or nodes that may act as transmitter and/receiver are User Equipment, Mobile Station, laptop, Personal Digital Assistant, Access Point, Radio Base Station, Radio Head and any other device having transmitting and/or receiving means enabling the dive to communicate wirelessly with another device.

Resource reservation for a wireless backhaul operation may also be carried out through above-mentioned contention on separate control channel. Whenever an AP relies on a wireless backhaul, such an AP should have an additional role except standard AP functionalities. In other words, any wireless backhaul based AP essentially has both AP function serving wireless devices and a backhaul-wireless device function responsible for communicating with Aggregate-Access Point, AGP, for a backhaul link.

The resource reservation of all these operations may be done as described above. However, AGP usually is of higher priority in reserving the data channel resources than both APs and wireless devices. This guarantees a sufficient ratio of resources reserved for backhaul communication, relative to that for the access link between AP and wireless devices. For backhaul transmission, in this general contention based architecture, a possibility of AP independent contention based reservation is not necessarily ruled out. In an example, it is mixed with above mentioned AGP scheduling process.

Both TxRR, transmission reservation request, & RC, reservation confirmation, messages may contain the source & destination MAC address/or node ID. The TxRR may also include start time and end time, sub-bands of the reservation request. Examples of two different kinds of procedures for TxRR/RC messages and their corresponding data communications could be as follows, similar kinds of procedures with a dynamic beamforming is also possible, but with a higher complexity:

Initiator node transmits requests at, or on, control channel, the request being broadcasted with an Omni-directional transmission while it transmits data at the data channel, the data being transmitted with an Omni-directional transmission as well. Example steps include:

At time t0: wireless device 1 sends TxRR to an AP on a control channel when it perceives an availability of control channel;

At time t1: the AP responds with an RC on the control channel when it senses an availability of control channel, if AP perceives a) no collision between TxRR and other transmission on control channel, b) so far no reservation has been done for the resource blocks specified by the TxRR message.

If such a RC is successfully received without a collision on the control channel, at the resource blocks specified at TxRR, a transmission of data will happen at data channel with an Omni-directional transmission.

Transmissions on both control and data channels may use the same beamforming pattern, i.e. cell-specific beamforming pattern, which is semi-static and can be configured for different cell-shaping at a time scale much larger than MAC operations.

Figure 3B:
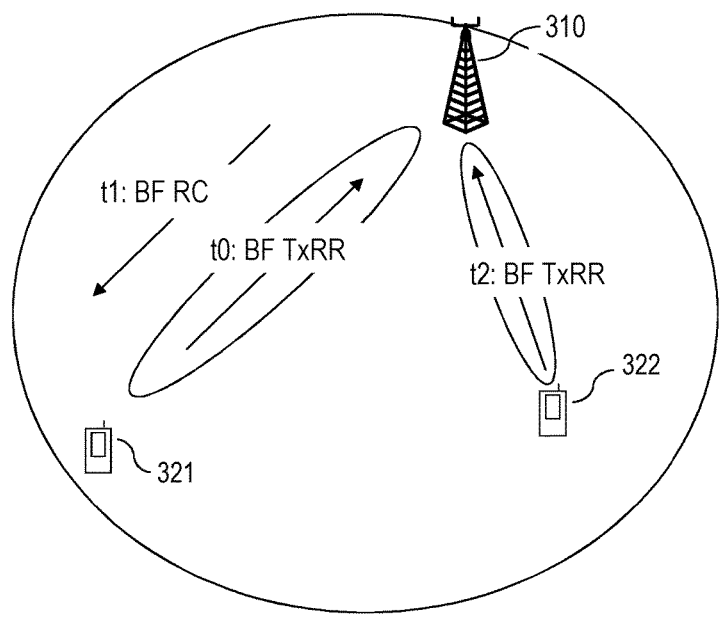
FIG. 3b is an illustration of exchange of TxRR and RC.

FIG. 3b illustrates an exemplifying message exchange procedure of the TxRR/RC messages. Referring to the figure:

At time t0: wireless device 321 sends a beamformed transmission reservation request, BF-TxRR, to AP 310 when it perceives an availability of the control channel;

At time t1: AP 310 responds with a beamformed reservation confirmation, BFRC, when it senses an availability of the control channel, if AP perceive a) no collision between TxRR and other transmission at control channel, b) so far no reservation has been done for the resource blocks defined by TxRR message. Depending on beamforming effect, such a TxRR may reach wireless device 322 or not. At time t2: wireless device 322—if it has not heard anything of beamformed TxRR/RC transmitted between the AP 310 and the wireless device 321—transmits its TxRR. Only at a successful reception of wireless device 322 TxRR, and AP 310 perceives a) no collision between wireless device 322 TxRR and other transmission at control channel, b) so far no reservation has been done for the resource blocks defined by wireless device 322 TxRR message, AP 310 will send an RC to device 322.

If the above mentioned RC is successfully received without a collision, at the resource blocks specified at wireless device 322 TxRR, the transmission of data will happen at data channel with a same beamforming shape as used when transmitting the TxRR. If the wireless device 322 TxRR is not acknowledged by AP 310 with an RC, the wireless device 322 will wait for a while within its waiting window size before sending another TxRR.

The methods described above may be employed in any wireless network, especially in wireless networks having relatively densely deployed APs or UEs, wherein efficient interference avoidance MAC is critical. The methods may further help to enhance the spectrum efficiency of a contention based MAC. In short, the methods described above could be applicable to any network which employs a contention-based MAC. The methods may be performed in every node or device within a wireless network because each of them needs to send out contention based control signalling such as TxRR or RC (as a transmitter or receiver).

The methods described above differ from e.g. Long term Evolution, LTE, Uplink, UL, random access in several ways. LTE UL random access indicates that a UE, wireless device, signals to an eNodeB, AP, to request a serving association or a synchronisation when the UE regards it as a best serving candidate among perceivable eNodeBs. However, the wireless devices and the respective method performed thereby in this disclosure disclose the new contention method for a transmitting node (either an AP or wireless device) to reserve a specific resource block for its transmission. Further, the transmitter and receiver are different: an LTE UL access is for a UE to send a signal to an eNodeB (AP) only while the wireless devices and the respective method performed thereby in this disclosure discuss any node including AP and wireless device to broadcast a reservation information to any nodes in the vicinity sharing radio resources. Still further, LTE UL random access does not specify any resource block while for the wireless devices and the respective method performed thereby in this disclosure, it may be a content for signals as described above.

The methods described above also differ from e.g. Wireless Local Area Network, WLAN, systems in several ways. The current WLAN system media access control, MAC, have control mechanisms built on Distributed Control Function, DCF, and Point Coordination Function, PCFs. But, all these operations signalling are conveyed in a full bandwidth, which differs from the wireless devices and the respective method performed thereby in this disclosure in that the wireless devices and the respective method performed thereby in this disclosure separates the control channel and data channel(s) in frequency bands. Generally, the wireless devices and the respective method performed thereby differ from the conventional WLAN in separating the contending and data bands to minimise the contention at data channel. Through exploiting the differences between data and contention channel bandwidths and between contention signalling duration and data transmission, the methods target to enhance the overall spectrum efficiency, even at high loads.

Embodiments herein also relate to a transmitting wireless device adapted for performing a transmission to a receiving wireless device both wireless devices operating in a wireless network applying a contention-based medium access control protocol, the wireless network operating on a frequency resource. The transmitting wireless device has the same objects, technical features as the method performed by the transmitting wireless device. The transmitting wireless device will hence only be described in brief in order to avoid unnecessary repetition.

Figure 4:
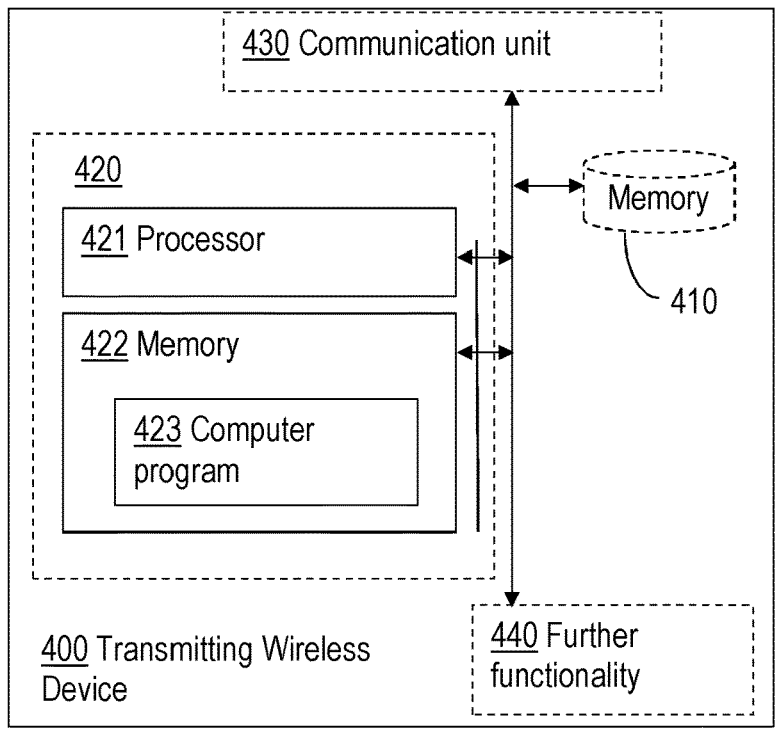
FIG. 4 is a block diagram of a transmitting wireless device adapted for performing a transmission to a receiving wireless device according to an exemplifying embodiment.

FIG. 4 is a block diagram of a transmitting wireless device adapted for performing a transmission to a receiving wireless device, wherein both wireless devices operate in a wireless network applying a contention-based medium access control protocol according to an exemplifying embodiment.

FIG. 4 illustrates the transmitting wireless device 400 comprising a processor 421 and memory 422. The memory comprises instructions, e.g. in the way of a computer program 423, which when executed by the processor 421 causes the transmitting wireless device 400 to identify a control channel of the frequency resource; and to contend, at the control channel, for resources on a data channel of the frequency resource. The memory further comprises instructions which when executed by the processor 421 causes the transmitting wireless device 400 to, when the contention for resources is successful, transmit data to the receiving wireless device on the data channel of the frequency resource, wherein the control channel and data channel operate on separate frequencies of the frequency resource.

The processor 421 and memory 422 are illustrated surrounded by a dotted box 420. This dotted box is optional and it illustrates the processor 421 and memory 422 may be part of processing means 420. The wireless device 400 is further illustrated comprising a communication unit 430. Through this unit, the transmitting wireless device 400 is adapted to communicate with other nodes and/or entities in the wireless communication network. The communication unit 430 comprise more than one receiving arrangement. For example, the receiving unit may be connected to both a wire and an antenna, by means of which the transmitting wireless device 400 is enabled to communicate with other nodes and/or entities in the wireless communication network. Similarly, the communication unit 430 may comprise more than one transmitting arrangement, which in turn may be connected to a wire and/or an antenna, by means of which the transmitting wireless device 400 is enabled to communicate with other nodes and/or entities in the wireless communication network. Still further, the transmitting wireless device 400 is illustrated comprising further functionality 440. Further functionality may be other entities, units and/or functions of the wireless device 400 not impacted or affected by the embodiments described herein.

The transmitting wireless device may have the same advantages as the method performed by the transmitting wireless device. In wireless networks where there is a plurality of users and/or the users generate a lot of traffic, the data channel or data channels may be kept free from interference, or the interference on the data channel may be reduced. Thus the interference handling may be efficient and reduced only to the control channel. Link adaptation may be facilitated. The solution may facilitate inter-network adaptation by reducing the inter-network interference, e.g. in case of multiple co-channels wireless networks with complete or partial coverage overlap, wherein the individual wireless networks are deployed by different owners or operations. The solution may further facilitate intra-network adaptation by reducing the inter-network interference, e.g. in case of one wireless device transmits in uplink at the same time-frequency resource blocks while another wireless device receives in downlink. Still a possible advantage is that the solution may be able to endure synchronisation errors due to relaxed synchronisation constraints over a large and ever-increasing number of nodes and/or devices.

Identifying the control channel may comprise receiving signalling, from the wireless network, indicating which frequency or frequencies the control channel operates on.

The memory may further comprise instructions which when executed by the processor 421 causes the transmitting wireless device 400 to, when the contention is unsuccessful, to back-off from contending for resources on the data channel for a period of time until anew contending for resources on a data channel on the control channel.

The period of time may be dependent on a priority of the transmitting wireless device.

According to an embodiment, wherein contending for resources comprises transmitting a data-transmission request to the receiving wireless device, the request comprises at least one of the following: identity of the transmitting wireless device; identity of the receiving wireless device; transmission start time of the data transmission; and duration in time of the data transmission.

The request may further comprise an indication of a portion of the data channel.

Embodiments herein also relate to a receiving wireless device adapted for receiving a transmission from a transmitting wireless device both wireless devices operating in a wireless network applying a contention-based medium access control protocol, the wireless network operating on a frequency resource. The receiving wireless device has the same objects, technical features as the method performed by the receiving wireless device. The receiving wireless device will hence only be described in brief in order to avoid unnecessary repetition.

Figure 5:
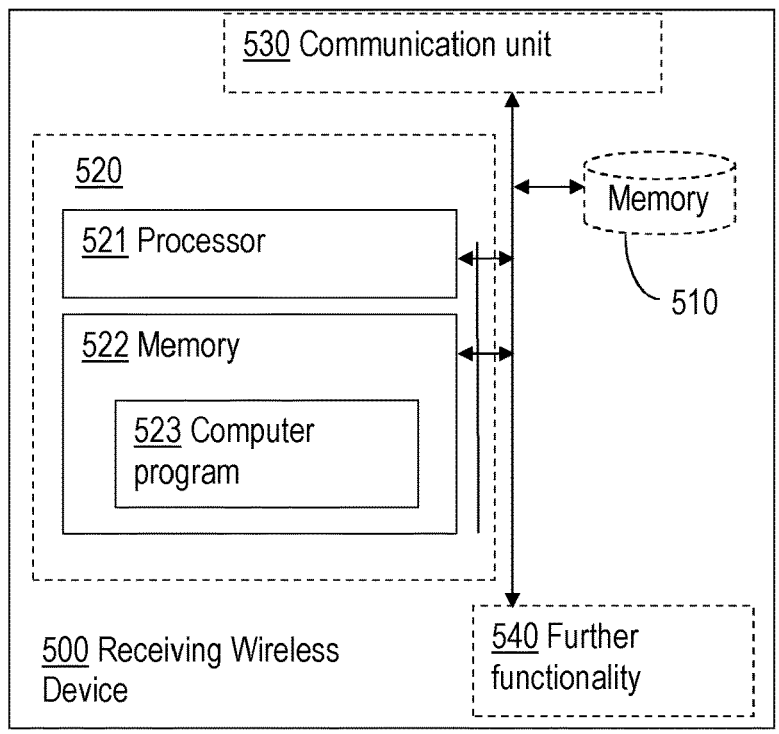
FIG. 5 is a block diagram of a receiving wireless device adapted for receiving a transmission from a transmitting wireless device according to an exemplifying embodiment.

FIG. 5 is a block diagram of a receiving wireless device adapted for receiving a transmission from a transmitting wireless device both wireless devices operating in a wireless network applying a contention-based medium access control protocol according to an exemplifying embodiment.

FIG. 5 illustrates the receiving wireless device 500 comprising a processor 521 and memory 522. The memory comprises instructions, e.g. in the way of a computer program 523, which when executed by the processor 522 causes the receiving wireless device 500 to identify a control channel of the frequency resource; and to receive, from the transmitting wireless device, on the identified control channel, a request for performing a transmission to the receiving wireless device on a data channel of the frequency resource. The memory further comprises instructions which when executed by the processor 522 causes the receiving wireless device 500 to determine that no other conflicting reservation of the data channel of the frequency resource has been performed, and to transmit a reservation confirmation to at least the transmitting wireless device.

The processor 521 and memory 522 are illustrated surrounded by a dotted box 520. This dotted box is optional and it illustrates the processor 521 and memory 522 may be part of processing means 520. The receiving wireless device 500 is further illustrated comprising a communication unit 530. Through this unit, the receiving wireless device 500 is adapted to communicate with other nodes and/or entities in the wireless communication network. The communication unit 530 comprise more than one receiving arrangement. For example, the receiving unit may be connected to both a wire and an antenna, by means of which the receiving wireless device 500 is enabled to communicate with other nodes and/or entities in the wireless communication network. Similarly, the communication unit 530 may comprise more than one transmitting arrangement, which in turn may be connected to a wire and/or an antenna, by means of which the receiving wireless device 500 is enabled to communicate with other nodes and/or entities in the wireless communication network. Still further, the receiving wireless device 500 is illustrated comprising further functionality 540. Further functionality may be other entities, units and/or functions of the wireless device 500 not impacted or affected by the embodiments described herein.

The receiving wireless device may have the same advantages as the method performed by the receiving wireless device. In wireless networks where there is a plurality of users and/or the users generate a lot of traffic, the data channel or data channels may be kept free from interference, or the interference on the data channel may be reduced. Thus the interference handling may be efficient and reduced only to the control channel. Link adaptation may be facilitated. The solution may facilitate inter-network adaptation by reducing the inter-network interference, e.g. in case of multiple co-channels wireless networks with complete or partial coverage overlap, wherein the individual wireless networks are deployed by different owners or operations. The solution may further facilitate intra-network adaptation by reducing the inter-network interference, e.g. in case of one wireless device transmits in uplink at the same time-frequency resource blocks while another wireless device receives in downlink. Still a possible advantage is that the solution may be able to endure synchronisation errors due to relaxed synchronisation constraints over a large and ever-increasing number of nodes and/or devices.

Identifying the control channel may comprise receiving signalling, from the wireless network, indicating which frequency or frequencies the control channel operates on.

The received request may comprise at least one of the following: identity of the transmitting wireless device; identity of the receiving wireless device; transmission start time of the data transmission; and duration of the data transmission.

The received request may comprise an indication of a portion of the data channel.

The memory 522 may further comprise instructions, which when executed by the processor 521 causes the receiving wireless device 500 to receive a reservation confirmation from a third wireless device, the received reservation confirmation comprising information pertaining to a reservation of at least a portion of the data channel for a period of time, wherein determining that no other reservation of a data channel of the frequency resource has been performed is based at least partly on the received reservation confirmation from the third wireless device.

The respective processor 421, 521 may be, or the processing means 420, 520 may comprise, a single CPU, Central Processing Unit, but could also comprise two or more processing units. For example, the processor may include general purpose microprocessors; instruction set processors and/or related chips sets and/or special purpose microprocessors such as ASICs, Application Specific Integrated Circuit. The processor may also comprise board memory for caching purposes. The computer program may be carried by a computer program product, i.e. memory 422, 522, connected to the processor. The computer program product may comprise a computer readable medium on which the computer program is stored. For example, the computer program product may be a flash memory, a Random-Access Memory, RAM, Read-Only Memory, ROM, or an Electrically Erasable Programmable Read-Only Memory, EEPROM, and the computer program modules described above could in alternative embodiments be distributed on different computer program products in the form of memories within the transmitting and receiving wireless device respectively.

Embodiments herein also relate to a transmitting wireless device for performing a transmission to a receiving wireless device both wireless devices operating in a wireless network applying a contention-based medium access control protocol, the wireless network operating on a frequency resource. The transmitting wireless device has the same objects, technical features as the method performed by the transmitting wireless device. The transmitting wireless device will hence only be described in brief in order to avoid unnecessary repetition.

Figure 6:
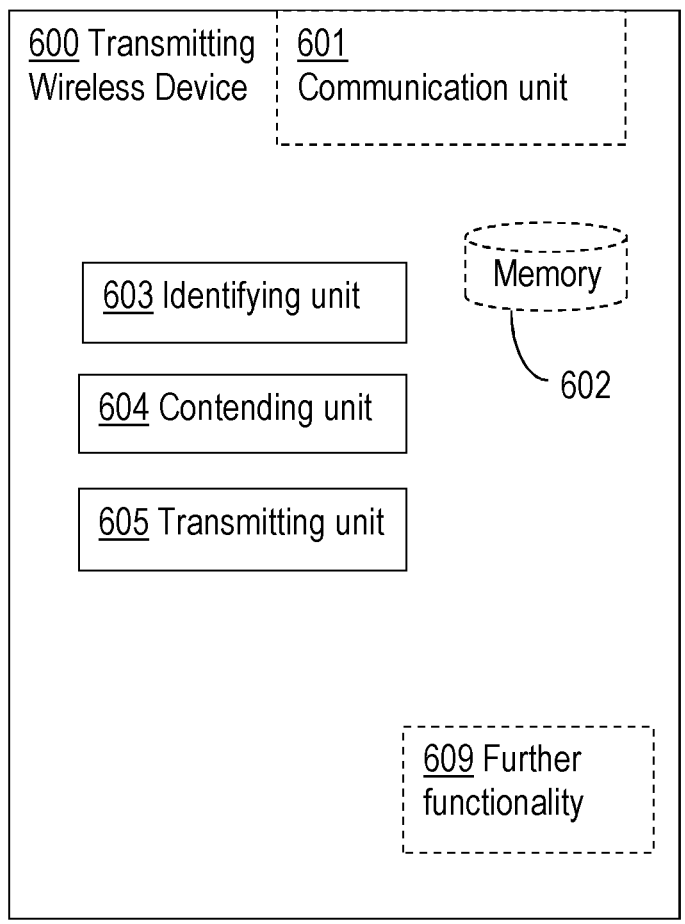
FIG. 6 is a block diagram of a transmitting wireless device for performing a transmission to a receiving wireless device according to an exemplifying embodiment.

FIG. 6 is a block diagram of a transmitting wireless device for performing a transmission to a receiving wireless device, wherein both wireless devices operate in a wireless network applying a contention-based medium access control protocol according to an exemplifying embodiment.

FIG. 6 illustrates the transmitting wireless device 600 comprising an identifying unit 603 for identifying a control channel of the frequency resource; and a contending unit 604 for contending, at the control channel, for resources on a data channel of the frequency resource. The transmitting wireless device 600 further comprises a transmitting unit 605 for, when the contention for resources is successful, transmitting data to the receiving wireless device on the data channel of the frequency resource, wherein the control channel and data channel operate on separate frequencies of the frequency resource.

The transmitting wireless device for performing a transmission to a receiving wireless device both wireless devices operating in a wireless network applying a contention-based medium access control protocol has the same advantages as the transmitting wireless device adapted for performing a transmission to a receiving wireless device both wireless devices operating in a wireless network applying a contention-based medium access control protocol. In wireless networks where there is a plurality of users and/or the users generate a lot of traffic, the data channel or data channels may be kept free from interference, or the interference on the data channel may be reduced. Thus the interference handling may be efficient and reduced only to the control channel. Link adaptation may be facilitated. The solution may facilitate inter-network adaptation by reducing the inter-network interference, e.g. in case of multiple co-channels wireless networks with complete or partial coverage overlap, wherein the individual wireless networks are deployed by different owners or operations. The solution may further facilitate intra-network adaptation by reducing the inter-network interference, e.g. in case of one wireless device transmits in uplink at the same time-frequency resource blocks while another wireless device receives in downlink. Still a possible advantage is that the solution may be able to endure synchronisation errors due to relaxed synchronisation constraints over a large and ever-increasing number of nodes and/or devices because of the sensing and reservation based schemes in contrast to any fixed-timing frame based schemes.

According to an embodiment, the identifying unit 603 identifies the control channel by receiving signalling, from the wireless network, indicating which frequency or frequencies the control channel operates on.

According to yet an embodiment, transmitting wireless device further comprises a backing-off unit for backing-off from contending for resources on the data channel for a period of time until anew contending for resources on a data channel is performed on the control channel.

The period of time for when the transmitting wireless device backs off from contending for resources may depend on a priority of the transmitting wireless device.

According to still an embodiment, the contending unit 604 may contend for resources by transmitting a data-transmission request to the receiving wireless device, the request comprising at least one of the identity of the transmitting wireless device, identity of the receiving wireless device, transmission start time of the data transmission, and duration in time of the data transmission.

The request may further comprise an indication of a portion of the data channel.

In FIG. 6, the transmitting wireless device 600 is also illustrated comprising communication unit 601. Through this unit, the transmitting wireless device 600 is adapted to communicate with other nodes and/or entities in the wireless communication network. The communication unit 601 may comprise more than one receiving arrangement. For example, the receiving unit may be connected to both a wire and an antenna, by means of which the transmitting wireless device 600 is enabled to communicate with other nodes and/or entities in the wireless communication network. Similarly, the communication unit 601 may comprise more than one transmitting arrangement, which in turn may be connected to a wire and/or an antenna, by means of which the transmitting wireless device 600 is enabled to communicate with other nodes and/or entities in the wireless communication network. The transmitting wireless device 600 further comprises a memory 602 for storing data. Further, the transmitting wireless device 600 may comprise a control or processing unit which in turns may be connected to the different units 603-605, as well as further functionality 609. It shall be pointed out that this is merely an illustrative example and the transmitting wireless device 600 may comprise more, less or other units or modules which execute the functions of the transmitting wireless device 600 in the same manner as the units illustrated in FIG. 6.

It should be noted that FIG. 6 merely illustrates various functional units in the transmitting wireless device 600 in a logical sense. The functions in practice may be implemented using any suitable software and hardware means/circuits etc. Thus, the embodiments are generally not limited to the shown structures of the transmitting wireless device 600 and the functional units. Hence, the previously described exemplary embodiments may be realised in many ways. For example, one embodiment includes a computer-readable medium having instructions stored thereon that are executable by the control or processing unit for executing the method steps in the transmitting wireless device 600. The instructions executable by the computing system and stored on the computer-readable medium perform the method steps of the transmitting wireless device 600 as set forth in the claims.

Embodiments herein also relate to a receiving wireless device for receiving a transmission from a transmitting wireless device both wireless devices operating in a wireless network applying a contention-based medium access control protocol, the wireless network operating on a frequency resource. The receiving wireless device has the same objects, technical features as the method performed by the receiving wireless device. The receiving wireless device will hence only be described in brief in order to avoid unnecessary repetition.

Figure 7:
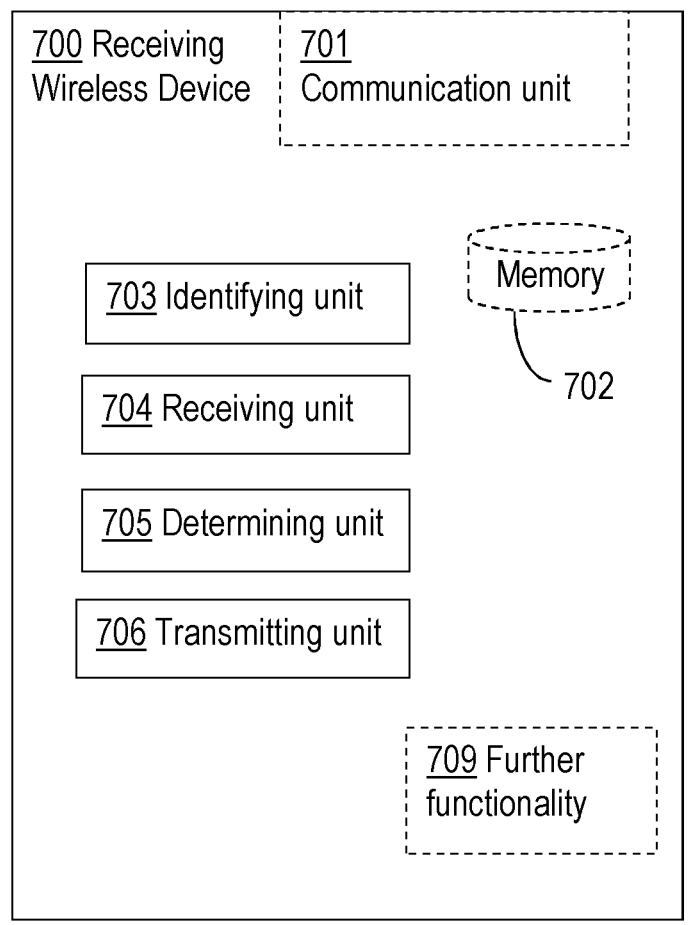
FIG. 7 is a block diagram of a receiving wireless device for receiving a transmission from a transmitting wireless device according to an exemplifying embodiment.

FIG. 7 is a block diagram of a receiving wireless device for receiving a transmission from a transmitting wireless device both wireless devices operating in a wireless network applying a contention-based medium access control protocol according to an exemplifying embodiment.

FIG. 7 illustrates the receiving wireless device 700 comprising an identifying unit 703 for identifying a control channel of the frequency resource, and a receiving unit 704 for receiving, from the transmitting wireless device, on the identified control channel, a request for performing a transmission to the receiving wireless device on a data channel of the frequency resource. The receiving wireless device 700 further comprises a determining unit 705 for determining that no other conflicting reservation of the data channel of the frequency resource has been performed; and a transmitting unit 706 for transmitting a reservation confirmation to at least the transmitting wireless device.

The receiving wireless device for receiving a transmission from a transmitting wireless device both wireless devices operating in a wireless network applying a contention-based medium access control protocol has the same possible advantages as the receiving wireless device adapted for receiving a transmission from a transmitting wireless device both wireless devices operating in a wireless network applying a contention-based medium access control protocol. In wireless networks where there is a plurality of users and/or the users generate a lot of traffic, the data channel or data channels may be kept free from interference, or the interference on the data channel may be reduced. Thus the interference handling may be efficient and reduced only to the control channel. Link adaptation may be facilitated. The solution may facilitate inter-network adaptation by reducing the inter-network interference, e.g. in case of multiple co-channels wireless networks with complete or partial coverage overlap, wherein the individual wireless networks are deployed by different owners or operations. The solution may further facilitate intra-network adaptation by reducing the inter-network interference, e.g. in case of one wireless device transmits in uplink at the same time-frequency resource blocks while another wireless device receives in downlink. Still a possible advantage is that the solution may be able to endure synchronisation errors due to relaxed synchronisation constraints over a large and ever-increasing number of nodes and/or devices.

According to an embodiment, the identifying unit 703 Identifies the control channel by receiving signalling, from the wireless network, indicating which frequency or frequencies the control channel operates on.

The received request may comprise at least one of the identity of the transmitting wireless device, identity of the receiving wireless device, transmission start time of the data transmission, and duration in time of the data transmission.

The received request may comprise an indication of a portion of the data channel.

The receiving unit 704 may further receive a reservation confirmation from a third wireless device, the received reservation confirmation comprising information pertaining to a reservation of at least a portion of the data channel for a period of time, wherein the determining unit 705 determines that no other reservation of a data channel of the frequency resource has been performed is based at least partly on the received reservation confirmation from the third wireless device.

In FIG. 7, the receiving wireless device 700 is also illustrated comprising a communication unit 701. Through this unit, the receiving wireless device 700 is adapted to communicate with other nodes and/or entities in the wireless communication network. The communication unit 701 may comprise more than one receiving arrangement. For example, the receiving unit may be connected to both a wire and an antenna, by means of which the receiving wireless device 700 is enabled to communicate with other nodes and/or entities in the wireless communication network. Similarly, the communication unit 701 may comprise more than one transmitting arrangement, which in turn is connected to both a wire and an antenna, by means of which the receiving wireless device 700 is enabled to communicate with other nodes and/or entities in the wireless communication network. The receiving wireless device 700 further comprises a memory 702 for storing data. Further, the receiving wireless device 700 may comprise a control or processing unit which in turns is connected to the different units 703-706, as well as further functionality 709. It shall be pointed out that this is merely an illustrative example and the receiving wireless device 700 may comprise more, less or other units or modules which execute the functions of the receiving wireless device 700 in the same manner as the units illustrated in FIG. 7.

It should be noted that FIG. 7 merely illustrates various functional units in the receiving wireless device 700 in a logical sense. The functions in practice may be implemented using any suitable software and hardware means/circuits etc. Thus, the embodiments are generally not limited to the shown structures of the receiving wireless device 700 and the functional units. Hence, the previously described exemplary embodiments may be realised in many ways. For example, one embodiment includes a computer-readable medium having instructions stored thereon that are executable by the control or processing unit for executing the method steps in the receiving wireless device. The instructions executable by the computing system and stored on the computer-readable medium perform the method steps of the receiving wireless device 700 as set forth in the claims.

Although the code means in the respective embodiments disclosed above in conjunction with FIGS. 6 and 7 are implemented as computer program modules which when executed in the respective processing unit causes the transmitting and the receiving wireless device respectively to perform the actions described above in the conjunction with figures mentioned above, at least one of the code means may in alternative embodiments be implemented at least partly as hardware circuits.

A respective processor (not shown in FIGS. 6 and 7) may be a single Central Processing Unit, CPU, but could also comprise two or more processing units. For example, the processor may include general purpose microprocessors; instruction set processors and/or related chips sets and/or special purpose microprocessors such as Application Specific Integrated Circuit, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory, RAM, Read-Only Memory, ROM or an Electrically Erasable Programmable Read-Only Memory, EEPROM, and the computer program modules described above could in alternative embodiments be distributed on different computer program products in the form of memories within the transmitting and receiving wireless device respectively.

Figure 8:
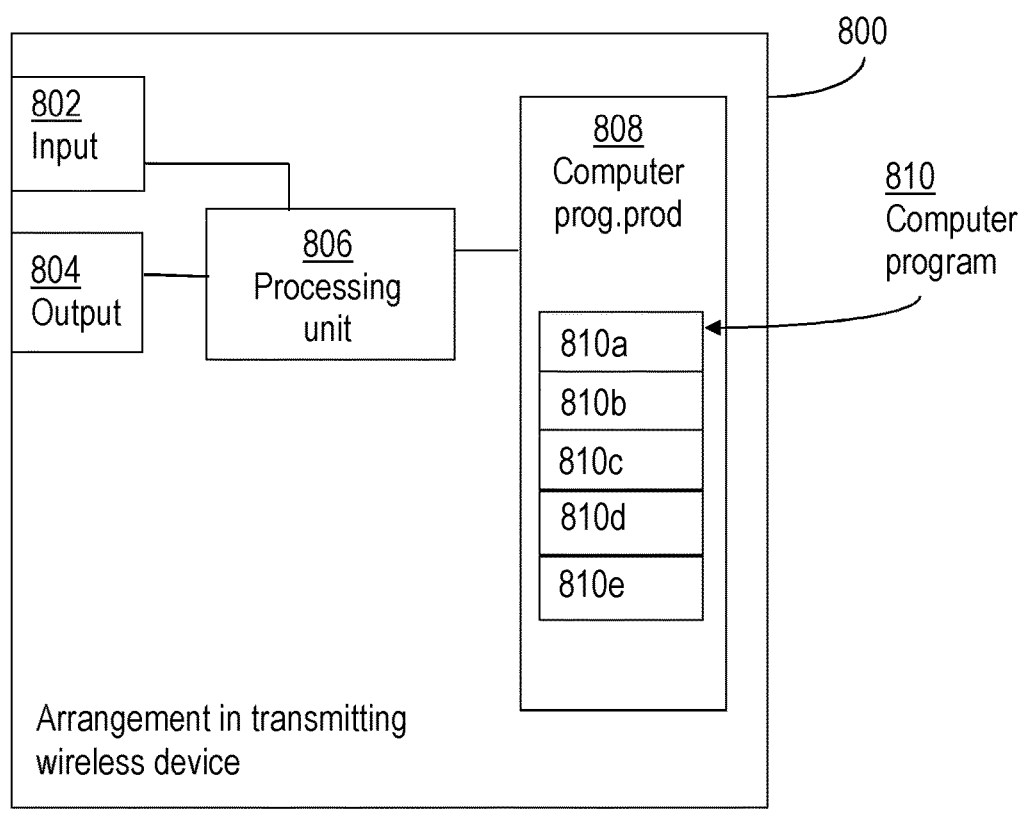
FIG. 8 is a block diagram of an arrangement in a transmitting wireless device for performing a transmission to a receiving wireless device according to an exemplifying embodiment.

FIG. 8 schematically shows an embodiment of an arrangement in a transmitting wireless device 800. Comprised in the transmitting wireless device 800 are here a processing unit 806, e.g. with a Digital Signal Processor, DSP. The processing unit 806 may be a single unit or a plurality of units to perform different actions of procedures described herein. The transmitting wireless device 800 may also comprise an input unit 802 for receiving signals from other entities, and an output unit 804 for providing signal(s) to other entities. The input unit and the output unit may be arranged as an integrated entity or as illustrated in the example of FIG. 6, as one or more interfaces 601.

Furthermore, the transmitting wireless device 800 comprises at least one computer program product 808 in the form of a non-volatile memory, e.g. an Electrically Erasable Programmable Read-Only Memory, EEPROM, a flash memory and/or a hard drive. The computer program product 808 comprises a computer program 810, which comprises code means, which when executed in the processing unit 806 in the transmitting wireless device 800 causes the transmitting wireless device 800 to perform the actions e.g. of the procedure described earlier in conjunction with FIG. 1a.

The computer program 810 may be configured as a computer program code structured in computer program modules 810a-810e. Hence, in an exemplifying embodiment, the code means in the computer program of the transmitting wireless device 800 comprises an identifying unit for identifying a control channel of the frequency resource; and a contending unit for contending, at the control channel, for resources on a data channel of the frequency resource. The computer program further comprises a transmitting unit for, when the contention for resources is successful, transmitting data to the receiving wireless device on the data channel of the frequency resource, wherein the control channel and data channel operate on separate frequencies of the frequency resource.

The computer program modules could essentially perform the actions of the flow illustrated in FIG. 1a, to emulate the transmitting wireless device 800. In other words, when the different computer program modules are executed in the processing unit 806, they may correspond to the units 603-605 of FIG. 6.

Figure 9:
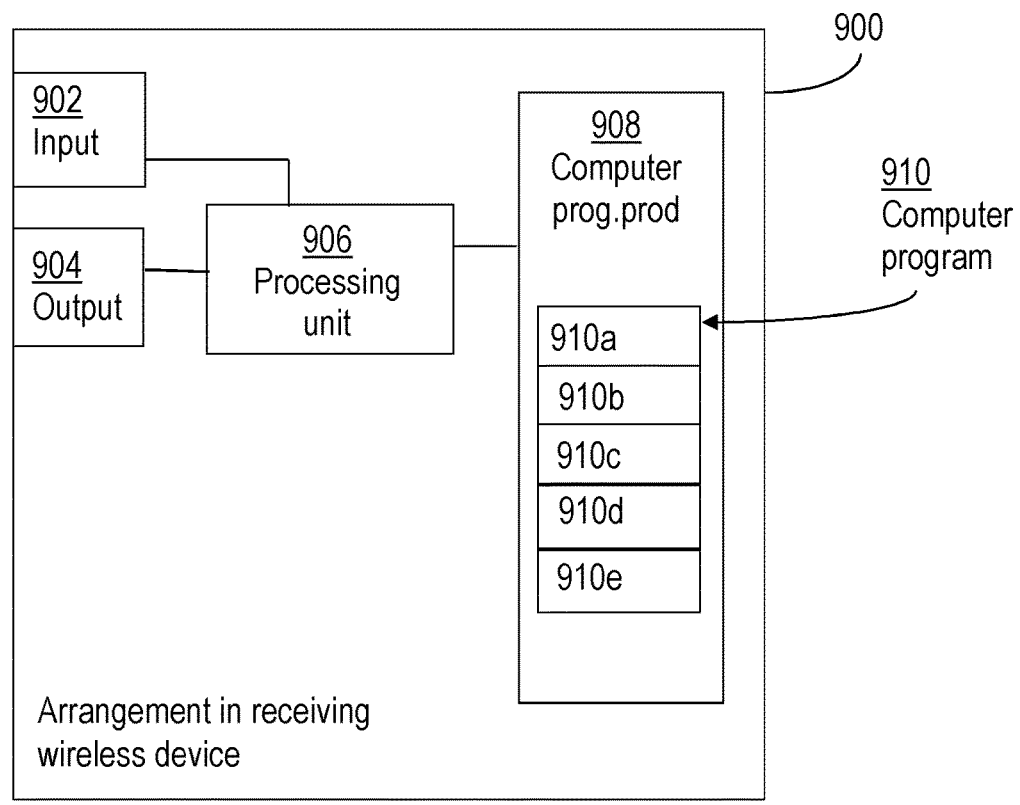
FIG. 9 is a block diagram of an arrangement in wireless device for receiving a transmission from a transmitting wireless device according to an exemplifying embodiment.

FIG. 9 schematically shows an embodiment of a receiving wireless device 900. Comprised in the receiving wireless device 900 are here a processing unit 906, e.g. with a Digital Signal Processor, DSP. The processing unit 906 may be a single unit or a plurality of units to perform different actions of procedures described herein. The may also comprise an input unit 902 for receiving signals from other entities, and an output unit 904 for providing signal(s) to other entities. The input unit and the output unit may be arranged as an integrated entity or as illustrated in the example of FIG. 7, as one or more interfaces 701.

Furthermore, the receiving wireless device 900 comprises at least one computer program product 908 in the form of a non-volatile memory, e.g. an Electrically Erasable Programmable Read-Only Memory, EEPROM, a flash memory and/or a hard drive. The computer program product 908 comprises a computer program 910, which comprises code means, which when executed in the processing unit 906 in the receiving wireless device 900 causes the receiving wireless device 900 to perform the actions e.g. of the procedure described earlier in conjunction with FIG. 2.

The computer program 910 may be configured as a computer program code structured in computer program modules 910a-910e. Hence, in an exemplifying embodiment, the code means in the computer program of the receiving wireless device 900 comprises an identifying unit for identifying a control channel of the frequency resource, and a receiving unit for receiving, from the transmitting wireless device, on the identified control channel, a request for performing a transmission to the receiving wireless device on a data channel of the frequency resource. The computer program further comprises a determining unit for determining that no other conflicting reservation of the data channel of the frequency resource has been performed; and a transmitting unit for transmitting a reservation confirmation to at least the transmitting wireless device.

The computer program modules could essentially perform the actions of the flow illustrated in FIG. 2, to emulate the receiving wireless device 900. In other words, when the different computer program modules are executed in the processing unit 906, they may correspond to the units 703-706 of FIG. 7.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities. While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a transmitting wireless device for performing a transmission to a receiving wireless device both wireless devices operating in a wireless network applying a contention-based medium access control protocol, the wireless network operating on a frequency resource, the method comprising:

identifying a control channel of the frequency resource,
contending, at the control channel, for resources on a data channel of the frequency resource, wherein contending for resources comprises transmitting a data-transmission request to the receiving wireless device, and wherein the data-transmission request comprises transmission start time of data transmission, and
when the contention for the resources is successful, transmitting data to the receiving wireless device on the data channel of the frequency resource, wherein the control channel and the data channel operate on separate frequencies of the frequency resource.

2. The method according to claim 1, wherein identifying the control channel comprises receiving signalling, from the wireless network, indicating which frequency or frequencies the control channel operates on.

3. The method according to claim 1, wherein when the contention for the resources is unsuccessful, the method further comprising the transmitting wireless device backing-off from contending for the resources on the data channel for a period of time until there is a new contending, at the control channel, for the resources on the data channel of the frequency resource.

4. The method according to claim 3, wherein the period of time is dependent on a priority of the transmitting wireless device.

5. The method according to claim 1, wherein the data-transmission request further comprises at least one of the following:
identity of the transmitting wireless device,
identity of the receiving wireless device, and
duration in time of the data transmission.

6. The method according to claim 1, wherein the data-transmission request further comprises an indication of a portion of the data channel.

7. A method performed by a receiving wireless device for receiving a transmission from a transmitting wireless device both wireless devices operating in a wireless network applying a contention-based medium access control protocol, the wireless network operating on a frequency resource, the method comprising:
identifying a control channel of the frequency resource,
receiving, from the transmitting wireless device, on the identified control channel, a request for performing a transmission to the receiving wireless device on a data channel of the frequency resource,
receiving a reservation confirmation from a third wireless device, wherein the received reservation confirmation comprises information pertaining to a reservation of at least a portion of the data channel for a period of time,
determining that no other conflicting reservation of the data channel of the frequency resource has been performed, wherein the determination is based at least partly on the received reservation confirmation from the third wireless device, and
transmitting, based on the determination, another reservation confirmation at least to the transmitting wireless device.

8. The method according to claim 7, wherein identifying the control channel comprises receiving signalling, from the wireless network, indicating which frequency or frequencies the control channel operates on.

9. The method according to claim 7, wherein the received request comprises at least one of the following:
identity of the transmitting wireless device,
identity of the receiving wireless device,
transmission start time of data transmission, and
duration of the data transmission.

10. The method according to claim 7, wherein the received request comprises an indication of a portion of the data channel.

11. A transmitting wireless device adapted for performing a transmission to a receiving wireless device both wireless devices operating in a wireless network applying a contention-based medium access control protocol, the wireless network operating on a frequency resource, the transmitting wireless device comprising a processor and memory, the memory comprising instructions which when executed by the processor cause the transmitting wireless device to:
identify a control channel of the frequency resource,
contend, at the control channel, for resources on a data channel of the frequency resource, wherein the contention for the resources comprises transmission of a data-transmission request to the receiving wireless device, and wherein the data-transmission request comprises transmission start time of data transmission, and
when the contention for the resources is successful, transmit data to the receiving wireless device on the data channel of the frequency resource, wherein the control channel and the data channel operate on separate frequencies of the frequency resource.

12. The transmitting wireless device according to claim 11, wherein the identification of the control channel comprises receipt of signalling, from the wireless network, indicating which frequency or frequencies the control channel operates on.

13. The transmitting wireless device according to claim 11, wherein when the contention for the resources is unsuccessful, the memory further comprising instructions, which when executed by the processor cause the transmitting wireless device to back-off from the contention for the resources on the data channel for a period of time until there is a new contention, at the control channel, for the resources on the data channel of the frequency resource.

14. The transmitting wireless device according to claim 13, wherein the period of time is dependent on a priority of the transmitting wireless device.

15. The transmitting wireless device according to claim 11, wherein the data-transmission request further comprises at least one of the following:
identity of the transmitting wireless device,
identity of the receiving wireless device, and
duration in time of the data transmission.

16. The transmitting wireless device according to claim 11, wherein the data-transmission request further comprises an indication of a portion of the data channel.

17. A receiving wireless device adapted for receiving a transmission from a transmitting wireless device, both wireless devices operating in a wireless network applying a contention-based medium access control protocol, the wireless network operating on a frequency resource, the receiving wireless device comprising a processor and memory, the memory comprising instructions which when executed by the processor cause the receiving wireless device to:
identify a control channel of the frequency resource,
receive, from the transmitting wireless device, on the identified control channel, a request for performing a transmission to the receiving wireless device on a data channel of the frequency resource,
receive a reservation confirmation from a third wireless device, wherein the received reservation confirmation comprises information pertaining to a reservation of at least a portion of the data channel for a period of time, determine that no other conflicting reservation of the data channel of the frequency resource[U] has been performed, wherein the determination is based at least partly on the received reservation confirmation from the third wireless device, and transmit, based on the determination, another reservation confirmation to at least the transmitting wireless device.

18. The receiving wireless device according to claim 17, wherein the identification of the control channel comprises receipt of signalling, from the wireless network, indicating which frequency or frequencies the control channel operates on.

19. The receiving wireless device according to claim 17, wherein the received request comprises at least one of the following:
  identity of the transmitting wireless device,
  identity of the receiving wireless device,
  transmission start time of data transmission, and
  duration of the data transmission.

20. The receiving wireless device according to claim 17, wherein the received request comprises an indication of a portion of the data channel.

21. A transmitting wireless device for performing a transmission to a receiving wireless device both wireless devices operating in a wireless network applying a contention-based medium access control protocol, the wireless network operating on a frequency resource, the transmitting wireless device comprising:
  at least one processor configured to:
    identify a control channel of the frequency resource, and
    contend, at the control channel, for resources on a data channel of the frequency resource, wherein the contention for the resources comprises transmission of a data-transmission request to the receiving wireless device, and wherein the data-transmission request comprises transmission start time of data transmission, and
  a transmitter configured to, when the contention for the resources is successful, transmit data to the receiving wireless device on the data channel of the frequency resource, wherein the control channel and the data channel operate on separate frequencies of the frequency resource.

22. A receiving wireless device for receiving a transmission from a transmitting wireless device both wireless devices operating in a wireless network applying a contention-based medium access control protocol, the wireless network operating on a frequency resource, the receiving wireless device comprising:
  at least one processor configured to:
  identify a control channel of the frequency resource,
  a receiver configured to:
    receive, from the transmitting wireless device, on the identified control channel, a request for performing a transmission to the receiving wireless device on the data channel of the frequency resource, and
    receive a reservation confirmation from a third wireless device, wherein the received reservation confirmation comprises information pertaining to a reservation of at least a portion of the data channel for a period of time,
  wherein the at least one processor is configured to determine that no other conflicting reservation of the data channel of the frequency resource has been performed, and wherein the determination is based at least partly on the received reservation confirmation from the third wireless device, and
  a transmitter configured to transmit, based on the determination, another reservation confirmation to at least the transmitting wireless device.

* * * * *